(12) United States Patent
Nitta

(10) Patent No.: US 10,167,976 B2
(45) Date of Patent: Jan. 1, 2019

(54) REGULATING VALVE

(71) Applicant: Azbil Corporation, Tokyo (JP)

(72) Inventor: Masashi Nitta, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 15/451,855

(22) Filed: Mar. 7, 2017

(65) Prior Publication Data
US 2017/0261125 A1 Sep. 14, 2017

(30) Foreign Application Priority Data

Mar. 8, 2016 (JP) .................. 2016-044143

(51) Int. Cl.
*F16K 41/02* (2006.01)
*F16K 3/02* (2006.01)

(52) U.S. Cl.
CPC ............... *F16K 41/02* (2013.01); *F16K 3/02* (2013.01); *F16K 3/0227* (2013.01); *F16K 3/0236* (2013.01)

(58) Field of Classification Search
CPC .......... F16K 41/02; F16K 3/02; F16K 3/0227; F16K 3/0236
(Continued)

(56) References Cited

U.S. PATENT DOCUMENTS

| 4,328,974 A * | 5/1982 | White | F16K 41/02 251/214 |
| 6,105,596 A * | 8/2000 | Hoyes | F16J 15/30 137/15.17 |

(Continued)

FOREIGN PATENT DOCUMENTS

| CN | 203809690 U | 9/2014 |
| CN | 204922200 U | 12/2015 |

(Continued)

OTHER PUBLICATIONS

The State Intellectual Property Office of People's Republic of China, "First Office Action", issued in Chinese Patent Application No. 201710134578.X, which is a counterpart to U.S. Appl. No. 15/451,855, dated Jul. 30, 2018, 12 pages. (6 pages of English Translation of Office Action and 6 pages of Office Action).

*Primary Examiner* — Kevin Murphy
*Assistant Examiner* — Kelsey Cary
(74) *Attorney, Agent, or Firm* — Amster, Rothstein & Ebenstein LLP

(57) ABSTRACT

A regulating valve that includes a valve stem for driving a valve body, and a gland portion slidably holding the valve stem, the gland portion including a lid portion having a through-hole communicating with the inside of the valve box, the valve stem being inserted into the through-hole, a spacer provided between the inner wall of the through-hole and the valve stem, one yarn packing disposed above the spacer, at least two adapter packings disposed via the yarn packing in a slide direction of the valve stem, the adapter packings being made of a material having a smaller thermal expansion coefficient and a higher hardness than the yarn packing, a packing follower disposed on the adapter packings opposite to the valve box, a disc spring disposed on the packing follower, and a packing flange disposed above the disc spring and the packing follower, the packing flange being fixed to the lid portion.

7 Claims, 9 Drawing Sheets

(58) Field of Classification Search
USPC .......................................................... 251/214
See application file for complete search history.

(56) References Cited

U.S. PATENT DOCUMENTS

| | | | | |
|---|---|---|---|---|
| 2004/0251635 A1* | 12/2004 | Ishida | ...................... | F16J 15/18 |
| | | | | 277/510 |
| 2005/0218604 A1* | 10/2005 | Shimizu | ................... | F16J 15/22 |
| | | | | 277/537 |
| 2014/0097373 A1* | 4/2014 | Linser | ..................... | F16K 41/02 |
| | | | | 251/355 |

FOREIGN PATENT DOCUMENTS

| | | |
|---|---|---|
| CN | 205026201 U | 2/2016 |
| JP | H08-270831 A | 10/1996 |

\* cited by examiner

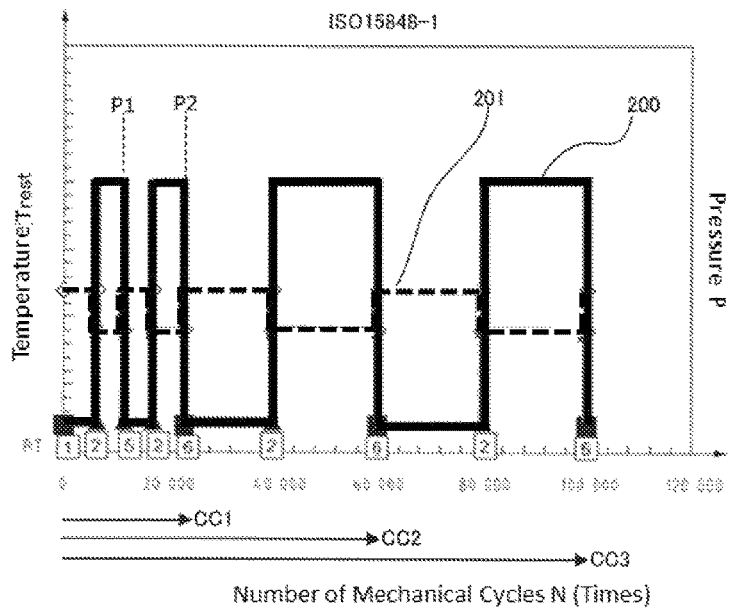

Fig. 5

| Component | | Regulating Valve 100 of First Embodiment | Conventional Regulating Valve 500 |
|---|---|---|---|
| Yarn Packing | Model | P4519 (Nippon Pillar Packing Co., Ltd.) | P4519 (Nippon Pillar Packing Co., Ltd.) |
| | Material | Core Material: Expanded Carbon Covering Material: Teflon | Core Material: Expanded Carbon Covering Material: Teflon |
| | Number of Pieces | One | Five |
| Adapter Packing | Model | P6720 (Nippon Pillar Packing Co., Ltd.) | - |
| | Material | Teflon And Expanded Carbon Woven Together | - |
| | Number of Pieces | Two | - |
| Carbon Ring | Model | P6210 C2fs (Nippon Pillar Packing Co., Ltd.) | - |
| | Material | Sintered Carbon And Resin | - |
| | Number of Pieces | Two | - |
| Disc Spring | Number of Pieces | Four | Four |

Fig. 6

REGULATING VALVE

CROSS-REFERENCE TO RELATED APPLICATION

The present application claims the benefit of and priority to Japanese Patent Application No. 2016-044143, filed on Mar. 8, 2016, the entire contents of which are incorporated by reference herein.

TECHNICAL FIELD

The present invention relates to a regulating valve and more particularly to, for example, the structure of a gland portion that prevents a fluid, as a control target, from leaking and that slidably holds a valve stem in a regulating valve.

BACKGROUND

Generally, packings are used as seal members in the gland portion of a regulating valve (see, for example, PTL 1). Of these packings above, a V-packing or a yarn packing is known as a main packing for primarily preventing a fluid from leaking from the inside of the valve box of a regulating valve.

As illustrated in FIGS. 9 and 10, a yarn packing is widely used as a main packing for a regulating valve since it has higher seal performance for a mechanical cycle, such as the reciprocating motion of a valve stem, than a V-packing. For example, in the case of a regulating valve used in an application for controlling a fluid as the control target at a temperature of 230 degrees or less, a yarn packing made of a fluororesin (for example, Teflon® (registered trademark, this is the same in the following)) is used as a main packing.

CITATION LIST

Patent Literature

[PTL 1] JP-A-8-270831

SUMMARY

However, as a result of consideration by the inventors of this application, even when a yarn packing is used as a main packing of the regulating valve, if a thermal cycle and a mechanical cycle are applied, the yarn packing undergoes shared deformation and the seal performance deteriorates. Detailed descriptions will be provided below with reference to the drawings.

FIG. 11 schematically illustrates a conventional regulating valve and FIG. 12 schematically illustrates the cross-sectional structure of the gland portion of the regulating valve illustrated in FIG. 11.

As illustrated in FIGS. 11 and 12, a gland portion 502 of a regulating valve 500 has the structure in which a plurality of yarn packings 54 as main packings are laminated with each other in the slide direction of a valve stem 51 via a spacer 53 in the gap between the inner wall of a stuffing box 52 provided above a valve box 501 and the valve stem 51, and the yarn packings 54 are tightened by a packing flange 60 via a packing follower 57, disc springs 58, and a spring case 59. This applies a pressure to the contact surface between the yarn packings 54 and the surface of the valve stem 51 and the contact surface between the yarn packings 54 and the inner wall of the stuffing box 52 and the pressure prevents the fluid in the valve box 501 from leaking from the gap between the valve stem 51 and the stuffing box 52.

In the conventional regulating valve 500, since the yarn packings 54 expand when the temperature rises, the pressure (referred to below as the "contact surface pressure") of the contact surface between the yarn packings 54 and the valve stem 51 increases. The disc springs 58 described above are used to prevent the contact surface pressure from being raised by the thermal expansion of the yarn packings 54. If the disc spring 58 is used, even when the yarn packings 54 are expanded due to a rise in the temperature, an increase in the volume due to the thermal expansion of the yarn packings 54 can be escaped as displacement (e.g., compression), in the slide direction (Y axis direction) of the valve stem 51, of the disc springs 58 via the packing follower 57, an increase in the contact surface pressure between the yarn packings 54 and the valve stem 51 can be prevented.

By the way, the conventional regulating valve 500 uses a set of (for example, five) yarn packings 54 instead of one yarn packing 54. Accordingly, when the temperature rises, the individual yarn packings 54 are expanded, an increase in the entire volume of the yarn packings becomes larger. Therefore, many disc springs 58 are necessary in the conventional regulating valve 500.

However, since the disc springs 58 are disposed in the limited space between the packing follower 57 and the packing flange 60 via the spring case 59, it is not easy to provide a sufficient number of disc springs 58 in order to prevent an increase in the contact surface pressure between the yarn packings 54 and the valve stem 51 caused by a rise in the temperature. When a sufficient number of disc springs 58 cannot be provided, an increase in the volume due to the thermal expansion of the yarn packings 54 cannot be absorbed by the disc springs 58 and the contact surface pressure between the yarn packing 54 and the valve stem 51 may increase when the temperature rises.

When a mechanical cycle is added by sliding the valve stem in the state in which the contact surface pressure between the yarn packings 54 and the valve stem 51 increases due to thermal expansion, the yarn packings 54 are apt to wear. Specifically, the yarn packings 54 undergo shared deformation at high temperature due to friction with the valve stem 51, part of the deformed yarn packings 54 enters the gap between the valve stem 51 and the packing follower 57, and part of the yarn packings 54 is lost. As a result, when the yarn packings 54 shrink due to reduction in the temperature, since the volume of the yarn packings 54 is reduced by the amount lost by shared deformation at high temperature, the contact surface pressure between the yarn packings 54 and the valve stem 51 reduces, possibly deteriorating the seal performance.

The invention addresses the above problems with an object of suppressing deterioration of the seal performance of the gland portion of a regulating valve.

A regulating valve (100) according to the invention includes a valve stem (1) for driving a valve body (or valve member) disposed in a valve box (101); and a gland portion (102) slidably holding the valve stem, in which the gland portion includes a lid portion (2) having a through-hole (2a) communicating with an inside of the valve box, the valve stem being inserted into the through-hole, a spacer (3) provided between an inner wall of the through-hole and the valve stem, one yarn packing (4) as a main packing, the yarn packing being disposed above a surface of the spacer (3), the surface being opposite to the valve box, at least two adapter packings (5) disposed above the surface of the spacer via the yarn packing in a slide direction of the valve stem, the surface being opposite to the valve box, the adapter packings being made of a material having a smaller thermal expansion coefficient and a higher hardness than the yarn packing, a packing follower (7) disposed on the adapter packings opposite to the valve box, a disc spring (8) disposed on the packing follower, and a packing flange (10) disposed above the disc spring and the packing follower, the packing flange being fixed to the lid portion.

In the regulating valve described above, the yarn packing may be a packing having a core material made of expanded graphite and a covering material made of fluororesin and the adapter packings may be packings formed by weaving textile of the fluororesin and textile of the expanded carbon together.

In the regulating valve described above, the gland portion may further include two carbon rings (6) disposed above the surface of the spacer via the yarn packing and the adapter packings in the slide direction of the valve stem, the surface being opposite to the valve box.

In the regulating valve described above, the gland portion may further include a wiper packing (14) provided between the spacer and the valve box.

In the above description, as an example, reference numerals in drawings corresponding to components of the invention are designated in parentheses.

As described above, according to the invention, it is possible to prevent deterioration of the seal performance of the gland portion of a regulating valve.

BRIEF DESCRIPTION OF THE DRAWINGS

FIG. 5 is a diagram for describing in detail the experiment of the leak rate of the regulating valve.

FIG. 6 illustrates the conditions of the packings of the regulating valves used for the experiment in FIG. 5.

DETAILED DESCRIPTION

An embodiment of the invention will be described below with reference to the drawings.

<Structure of the Regulating Valve 100>

Figure 1:
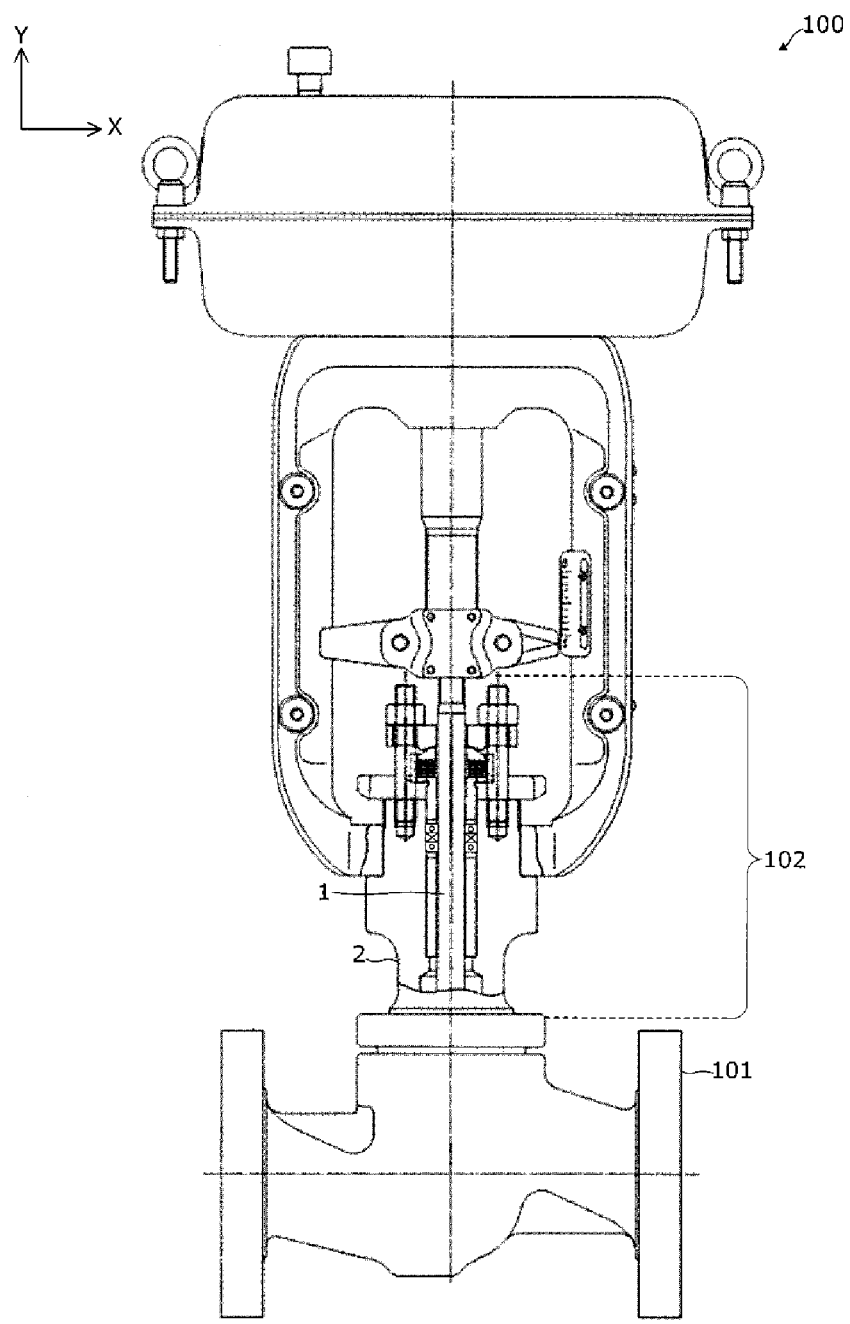
FIG. 1 schematically illustrates a regulating valve according to an embodiment of the invention.

FIG. 1 schematically illustrates the regulating valve according to an embodiment of the invention.

A regulating valve 100 illustrated in FIG. 1 is a glove-shaped regulating valve for controlling a flow of a fluid from one flow channel to another flow channel and is used in an application for controlling a fluid as the control target at a temperature of, for example, 230 degrees or less. In addition, the fluid introduced into the regulating valve 100 may be a liquid or gas, and is not particularly limited.

The regulating valve 100 includes a valve stem 1 for driving a valve body (or valve member) (not illustrated) disposed in a valve box 101 and a gland portion 102 that prevents the fluid as the control target from leaking and that slidably holds the valve stem 1. The gland portion 102 has the structure in which one main packing and two adapter packings are included. The gland portion 102 will be described in detail below.

<Structure of the Gland Portion 102>

Figure 2:
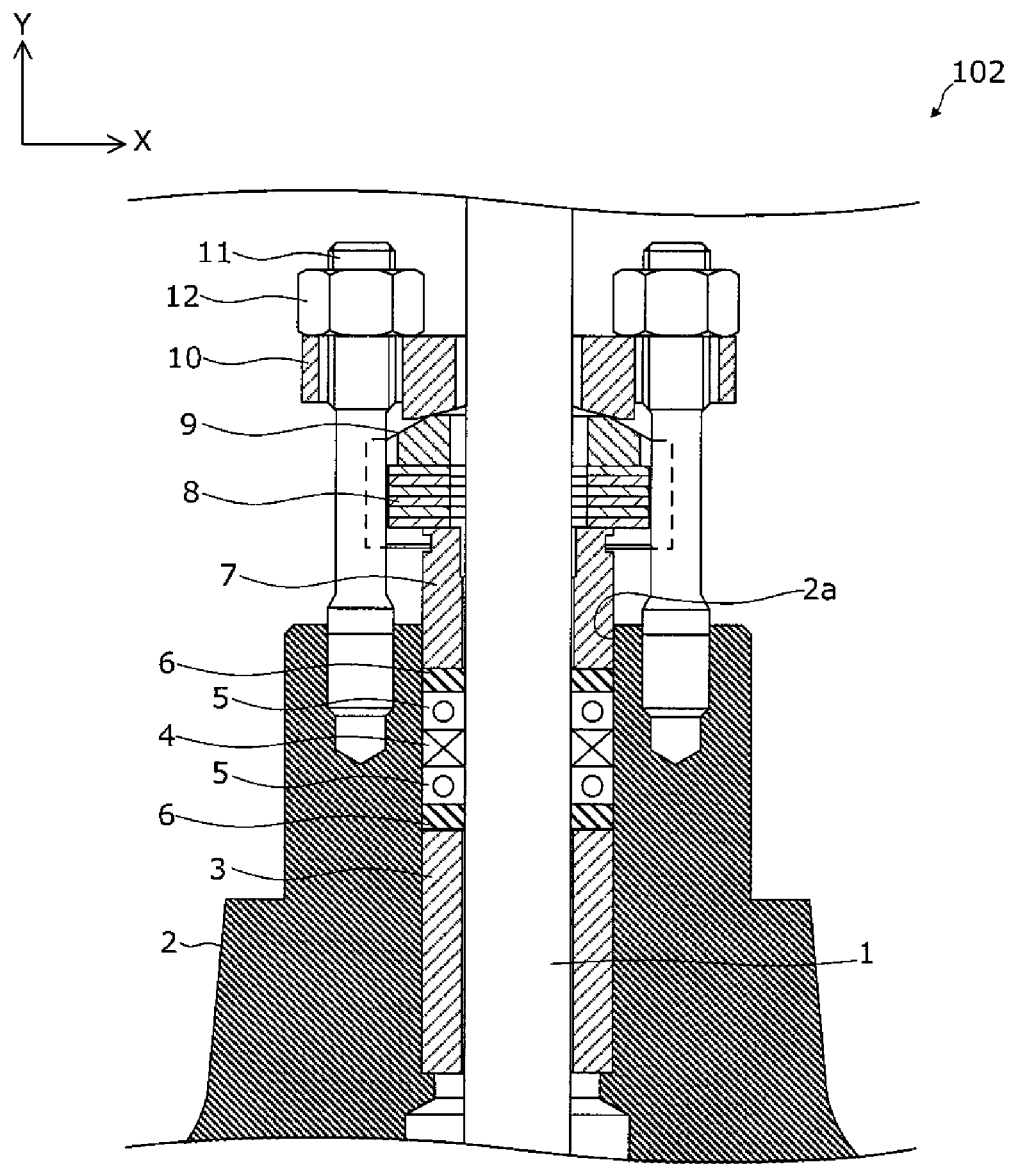
FIG. 2 schematically illustrates the cross-sectional structure of a gland portion of the regulating valve according to an embodiment of the invention.

FIG. 2 schematically illustrates the cross-sectional structure of the gland portion 102 of the regulating valve 100 according to an embodiment.

As illustrated in this drawing, the gland portion 102 of the regulating valve 100 includes a stuffing box 2, a spacer 3, a yarn packing 4, adapter packings 5, carbon rings 6, a packing follower 7, disc springs 8, a spring case 9, a packing flange 10, a gland stud 11, and a gland nut 12. Of these components, the components excluding the packings (the yarn packing 4, the adapter packings 5, and the carbon rings 6) are made of a material (for example, metal) having resistance against deformation and corrosion due to a flow of a fluid.

The stuffing box 2 is a lid portion that has a through-hole 2a communicating with the inside of the valve box 101 and is fixed to the upper part (the positive direction of the Y axis with respect to the valve box 101) of the valve box 101. In the stuffing box 2, the valve stem 1 is inserted into the through-hole 2a.

The spacer 3, the yarn packing 4, the adapter packings 5, the carbon rings 6, and the packing follower 7 are provided between the inner wall of the through-hole 2a of the stuffing box 2 and the valve stem 1.

The spacer 3 is a component for padding the space between the inner wall of the through-hole 2a of the stuffing box 2 and the valve stem 1.

The yarn packing 4 is a gland packing that is rectangular (substantially square) in sectional view and the yarn packing 4 is disposed above the surface (the surface of the spacer 3 on the positive side of the Y axis) of the spacer 3 opposite to the valve box 101. In an exemplary embodiment, one yarn packing 4 is used as the main packing of the gland portion 102.

An example of the yarn packing 4 is a packing including a fluororesin (for example, Teflon®) as a covering material. For example, it is possible to use, as the yarn packing 4, the P4519, manufactured by Nippon Pillar Packing Co., Ltd., that includes expanded carbon as the core material and Teflon® as the covering material.

The adapter packing 5 prevents damage due to deformation of the yarn packing 4 and is made of a material having a smaller thermal expansion coefficient and higher hardness than the yarn packing 4.

The thermal expansion coefficient is, for example, a linear expansion coefficient. In addition, the measured value of the hardness of the adapter packing 5 obtained by, for example, a durometer only needs to be higher than in the yarn packing 4.

An example of the adapter packing 5 is a packing that includes a fluororesin as the covering material and is formed by weaving textile of fluororesin and textile of expanded carbon together. For example, when the P4519 manufactured by Nippon Pillar Packing Co., Ltd. described above is used as the yarn packing 4, the P6720 manufactured by weaving textile of Teflon® and textile of expanded carbon together by Nippon Pillar Packing Co., Ltd. can be used as the adapter packing 5.

At least two adapter packings 5 are provided in the slide direction (Y axis direction) of the valve stem 1 so as to sandwich the yarn packing 4 therebetween. Specifically, as illustrated in FIG. 2, one of the adapter packings 5 is placed, via the carbon ring 6 described later, on the surface of the spacer 3 opposite to the valve box 101, the yarn packing 4 is placed on the adapter packing 5, and the other of the adapter packings 5 is placed on the yarn packing 4.

The carbon rings 6 prevent damage due to deformation of the adapter packing 5. At least two carbon rings 6 are provided in the slide direction (Y axis direction) of the valve stem 1 so as to sandwich the yarn packing 4 and the adapter packings 5 therebetween. Specifically, as illustrated in FIG. 2, one of the carbon rings 6 is placed on the surface of the spacer 3 opposite to the valve box 101 and the other of the carbon rings 6 is placed on the adapter packing 5 disposed on the positive side of the Y axis.

The packing follower 7 is one component (packing retainer) for pushing a packing against the spacer 3. The packing follower 7 is disposed via the carbon ring 6 above the adapter packing 5 on the positive side of the Y axis.

The disc spring 8 is a component that suppresses an increase in the contact surface pressure between the packings (the yarn packing 4 and the adapter packings 5) and the valve stem 1 due to expansion of the packings and suppresses reduction in the pressure for pushing the packings due to looseness of the gland stud 11 and the gland nut 12, which will be described later.

A plurality of disc springs 8 are laminated with each other, for example, in the spring case 9. Specifically, of the plurality of disc springs 8 accommodated in the spring case 9, the lowermost (negative side of the Y axis) disc spring 8 is disposed on the surface (surface on the positive side of the Y axis) of the packing follower 7 and the uppermost (positive side of the Y axis) disc spring 8 is pressed by the spring case 9 downward (negative side of the Y axis).

FIG. 2 illustrates, as an example, the case in which six disc springs 8 are laminated with each other on the packing follower 7.

The packing flange 10 is a component that fixes the yarn packing 4, the adapter packings 5, the packing follower 7, the disc springs 8, and the spring case 9 onto the stuffing box 2.

The packing flange 10 is disposed on the spring case 9 and is fixed onto the stuffing box 2 by the gland stud 11 and the gland nut 12. Specifically, as illustrated in FIG. 2, the packing flange 10 is fixed to the stuffing box 2 by tightening the gland stud 11 inserted into a through-hole formed in the packing flange 10 and a screw hole formed in the stuffing box 2 using the gland nut 12, so that the spring case 9, the disc spring 8, and the packing follower 7 are fixed while being pressed from upward. This applies a pressure to the yarn packing 4 and the adapter packing 5 from upward, thereby sealing the gap between the valve stem 1 and the through-hole 2a of the stuffing box 2.

<Effects of the Regulating Valve 100>

In the regulating valve 100 having the gland portion 102 of the above structure, since the number of yarn packings 4 is less than in the conventional regulating valve and the yarn packing 4 is sandwiched by the adapter packings 5 having a smaller thermal expansion coefficient than the yarn packing 4, the compression of the disc springs 8 relative to the thermal expansion of the yarn packing 4 at high temperatures can become reduced than in the case in which a set of yarn packings of the same type is used, thereby enabling the suppression of the entire thermal expansion of the packings.

In addition, in the regulating valve 100, by using the adapter packing 5 made of a material harder than the yarn packing 4, even when the yarn packing 4 undergoes shared deformation, it is possible to prevent part of the yarn packing 4 from entering the gap between the valve stem 1 and the packing follower 7.

The experimental results of a leak rate of the regulating valve 100 according to the embodiment will be described below.

Figure 3:
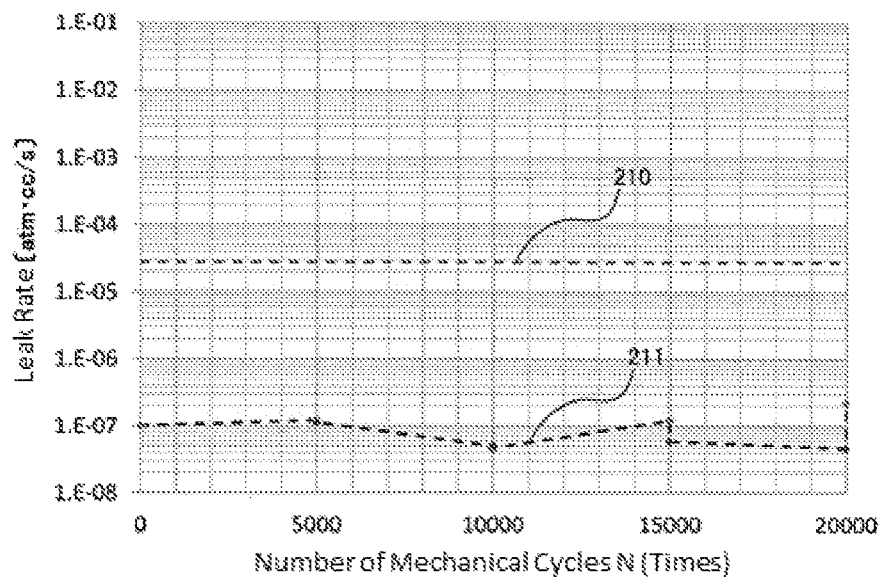
FIG. 3 illustrates the experimental results of a leak rate of the regulating valve according to an embodiment of the invention.
Figure 4:
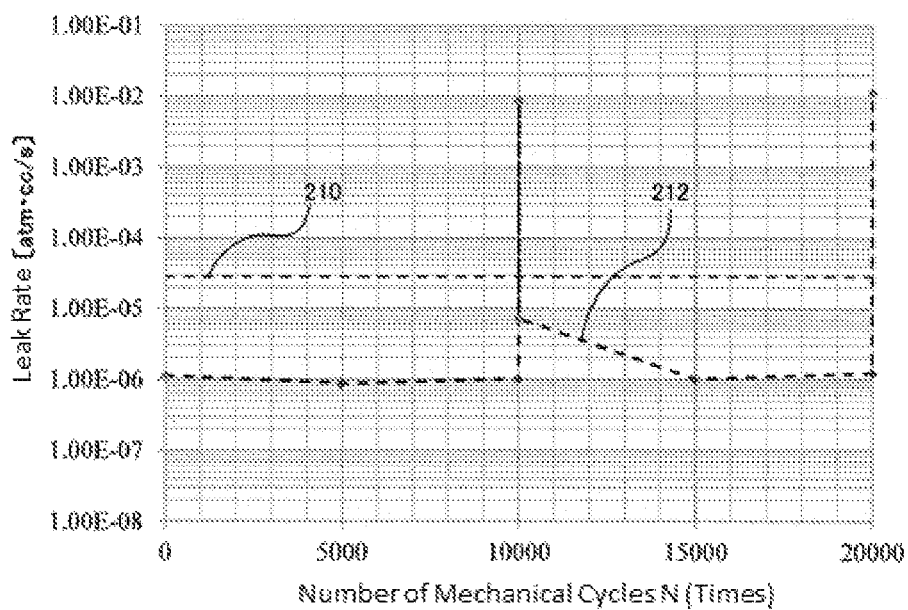
FIG. 4 illustrates the experimental results of a leak rate of a conventional regulating valve.
Figure 11:
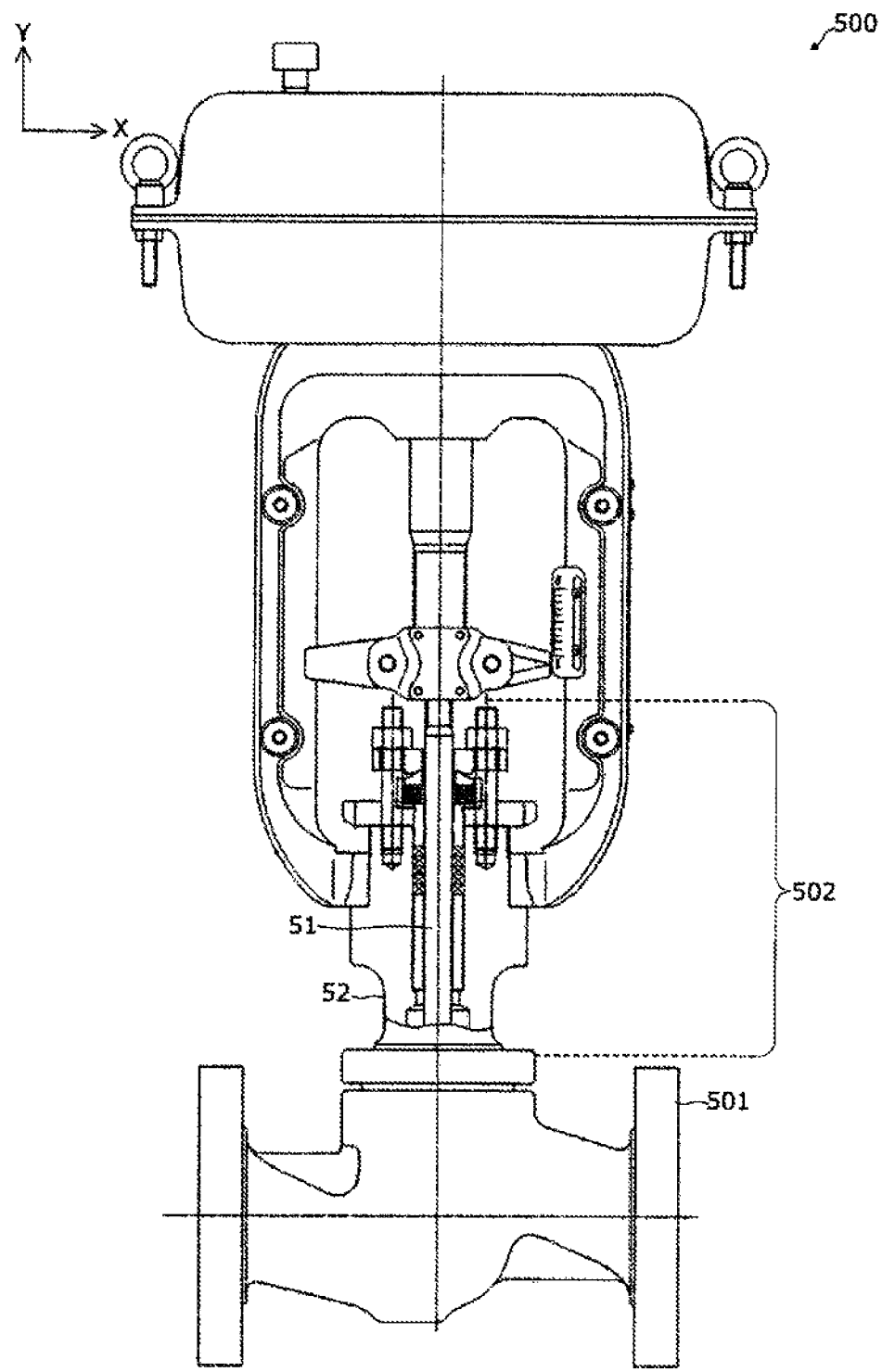
FIG. 11 schematically illustrates the conventional regulating valve.
Figure 12:
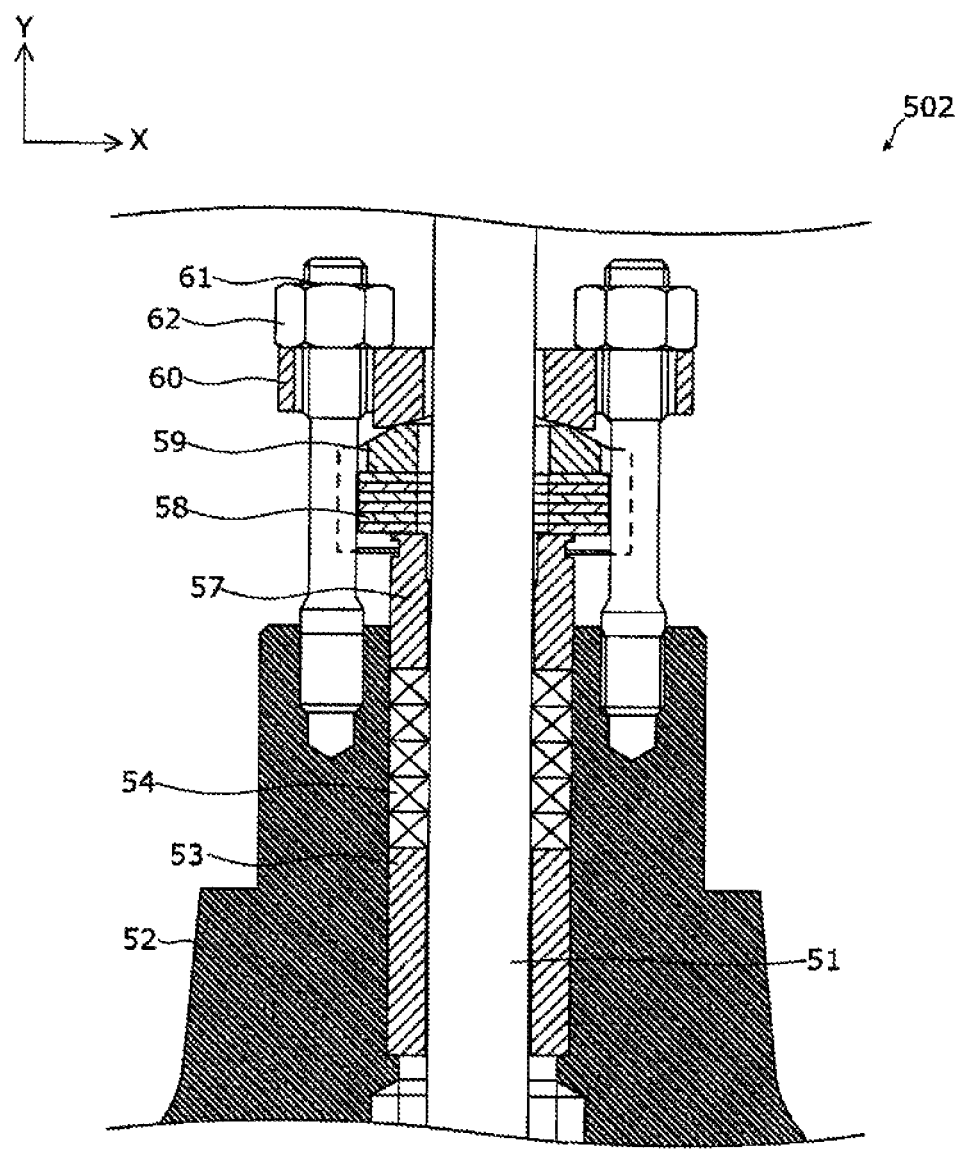
FIG. 12 schematically illustrates the cross-sectional structure of the gland portion of the conventional regulating valve.

FIG. 3 illustrates the experimental results of the leak rate of the regulating valve 100 according to an embodiment and FIG. 4 illustrates the experimental results of the leak rate of the conventional regulating valve 500 (see FIGS. 11 and 12). In FIGS. 3 and 4, reference numeral 210 indicates the upper limit (also referred to below as the reference value) of the leak rate allowed for the regulating valve, reference numeral 211 indicates the measurement results of the leak rate of the regulating valve 100, and reference numeral 212 indicates the measurement results of the leak rate of the conventional regulating valve 500.

The measurement results of the leak rate illustrated in FIGS. 3 and 4 are the results of an experiment performed according to ISO15848-1-2006 (Industrial valves—Measurement, test and qualification procedures for fugitive emissions—Part 1: Classification system and qualification procedures for type testing of valves). Specifically, FIGS. 3 and 4 illustrate the leak rates of the regulating valves 100 and 500 versus the number of mechanical cycles N, respectively, when mechanical cycles (sliding of the valve stem) are added to the regulating valves 100 and 500 in the state in which the temperature (Trest) and the pressure (P) of a fluid are changed as illustrated in FIG. 5. In FIG. 5, solid line 200 reflects the temperature (Trest) and dashed line 201 reflects the pressure (P) of the fluid being regulated. CC1, CC2, and CC3 respectively illustrate testing conditions of 20,000, 60,000, and 100,000 slidings of the valve stem—i.e., mechanical cycles N. In addition, FIG. 5 indicates a number of points at which the leak rate is measured. For example, the leak rate is measured at room temperature before any slidings at point "1" shown in FIG. 5, the leak rate is measured after 5000 slidings at room temperature at points "2," and the leak rate is measured after respective temperature changes at points "5" and "6."

FIG. 6 illustrates the conditions of the packings of the regulating valves 100 and 500 used in the above experiment.

As illustrated in FIG. 6, the regulating valve 100 used in the experiment described above has a packing structure including the yarn packing 4, the adapter packings 5, and the carbon rings 6 as illustrated in FIG. 2 and uses one yarn packing 4 (P4519 manufactured by Nippon Pillar Packing Co., Ltd. described above), two adapter packings 5 (P6720 manufactured by Nippon Pillar Packing Co., Ltd. described above), and two carbon rings (P6210 C2FS, made of sintered carbon and resin, that is manufactured by Nippon Pillar Packing Co., Ltd.). In addition, the regulating valve 500 of the conventional structure used in the above experiment has a packing structure including only the yarn packings 54 and uses five yarn packings 54 (P4519 manufactured by Nippon Pillar Packing Co., Ltd. described above) as illustrated in FIG. 12. On the other hand, both the regulating valve 100 and the regulating valve 500 have four disc springs (8 and 58).

As a result of the experiment performed under the above conditions, in the conventional regulating valve 500, a fluid leakage exceeding the reference value 210 occurred when the number of mechanical cycles was 10000 (at timing P1 illustrated in FIG. 5) as illustrated in FIG. 4.

The possible causes will be described below. As described above, the expansion of the five yarn packings 54 could not be absorbed by the disc springs 58 at high temperature, the contact pressure between the yarn packings 54 and the valve stem 51 increased, the yarn packings 54 underwent shared deformation, and the yarn packings 54 was gradually lost as mechanical cycles increased. Then, it was considered that, when the yarn packings 54 shrank at timing P1 at which the temperature dropped, the contact pressure between the yarn packings 54 and the valve stem 51 was reduced due to reduction in the volume of the yarn packings 54, and the seal performance deteriorated. Although a fluid leakage exceeding the reference value 210 also occurred at the timing (timing P2 in FIG. 5) at which the temperature dropped and the number of mechanical cycles is 20000 (as shown at the end of the graph in FIG. 4), the cause is the same as above.

In contrast, in the regulating valve 100, even when the number of mechanical cycles is 20000 as illustrated in FIG. 3, a fluid leakage exceeding the upper limit 210 of the allowable leak rate did not occur.

This is partly because the amount of compression of the disc springs 8 with respect to the amount of expansion of the yarn packing 4 at high temperature could become reduced than in the conventional regulating valve 500 since only one yarn packing 4 was used and the expansion of the yarn packing 4 could be absorbed sufficiently by the disc spring 8. That is, it was considered that, since the only one yarn packing 4 was used and the yarn packing 4 was sandwiched by the two adapter packings 5 having a thermal expansion coefficient smaller than the yarn packing 4, an increase in the entire volume of the packings at high temperature was smaller than in the conventional regulating valve 500 and the compression of the disc spring 8 relative to the thermal expansion of the yarn packing 4 at high temperature could become reduced. It was consider that this could suppress an increase in the contact pressure between the yarn packing 4 and the valve stem 1 at high temperature, thereby preventing reduction in the volume caused by wear of the yarn packing 4.

As described above, in the regulating valve 100, the seal performance of the gland portion can be improved as compared with the conventional regulating valve including a set of yarn packings.

<Modification of the Gland Portion>

As described above, an exemplary embodiment of the invention implemented by the inventors has been described. However, the invention is not limited to the embodiment and it will be appreciated that various modifications can be made without departing from the scope of the invention.

Figure 7:
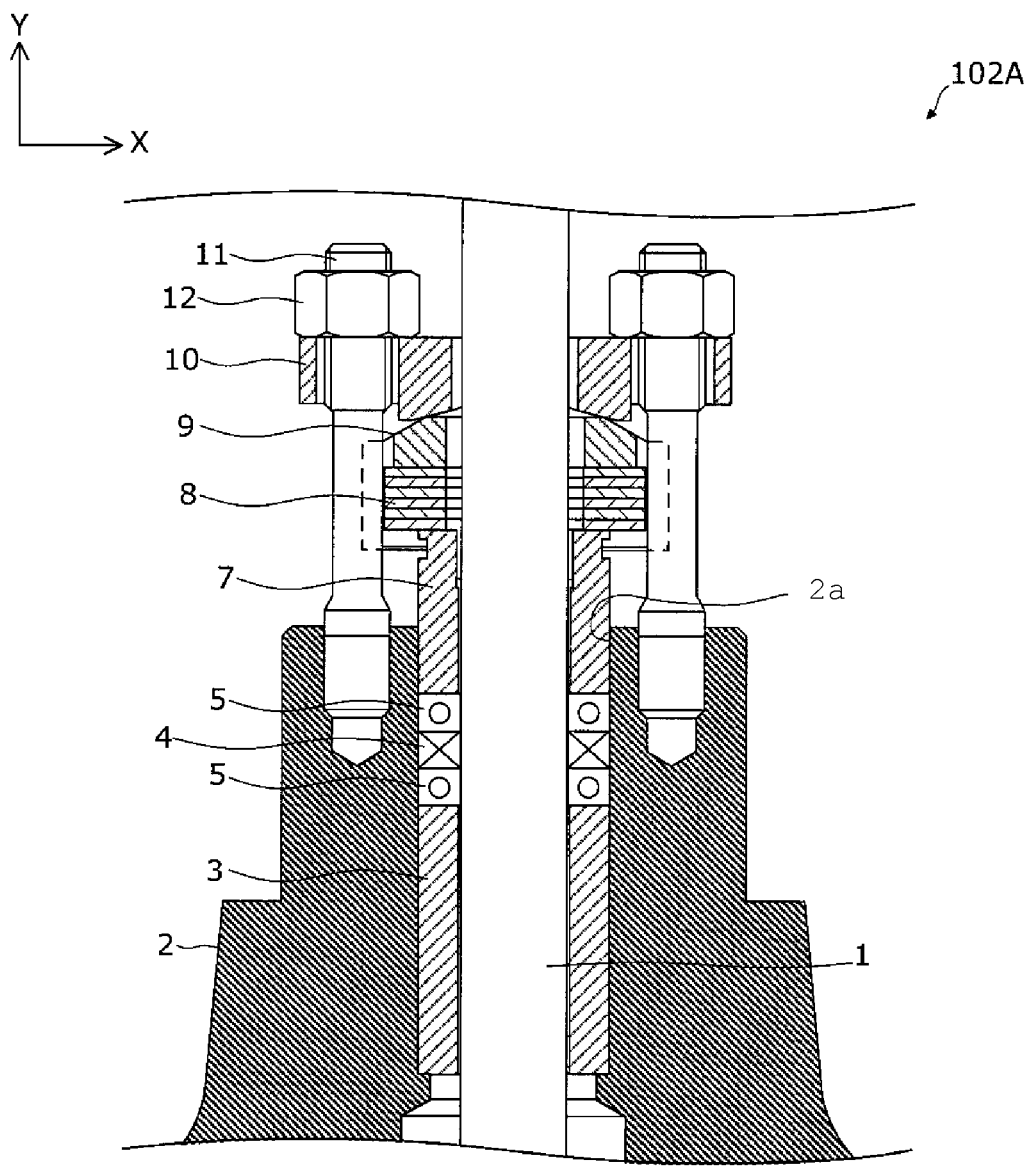
FIG. 7 schematically illustrates another cross-sectional structure of the gland portion of the regulating valve according to an embodiment of the invention.

For example, when the adapter packings 5 have sufficient strength, the carbon rings 6 do not need to be provided, as in a gland portion 102A illustrated in FIG. 7.

Figure 8:
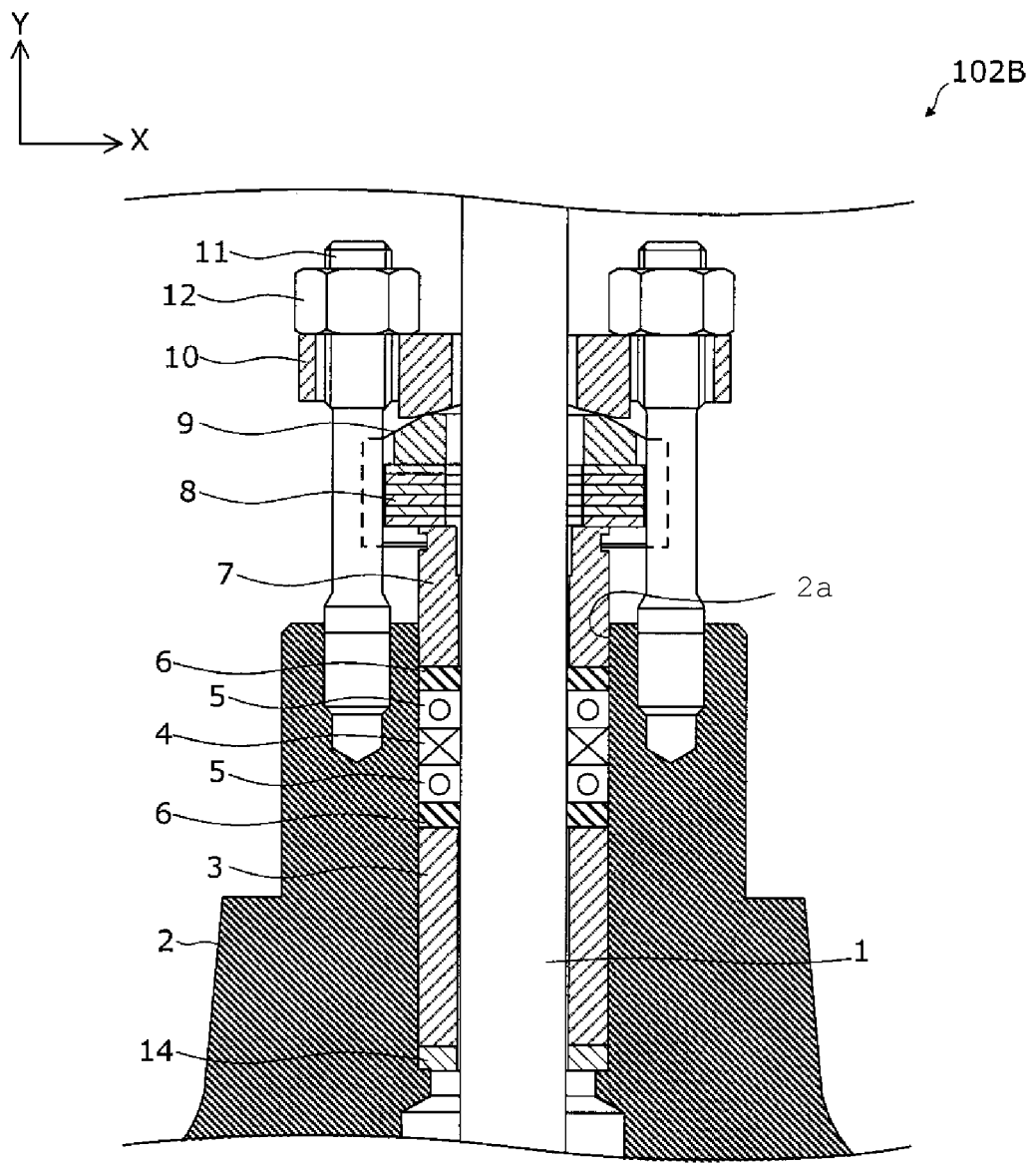
FIG. 8 schematically illustrates another cross-sectional structure of the gland portion of the regulating valve according to an embodiment of the invention.
Figure 9:
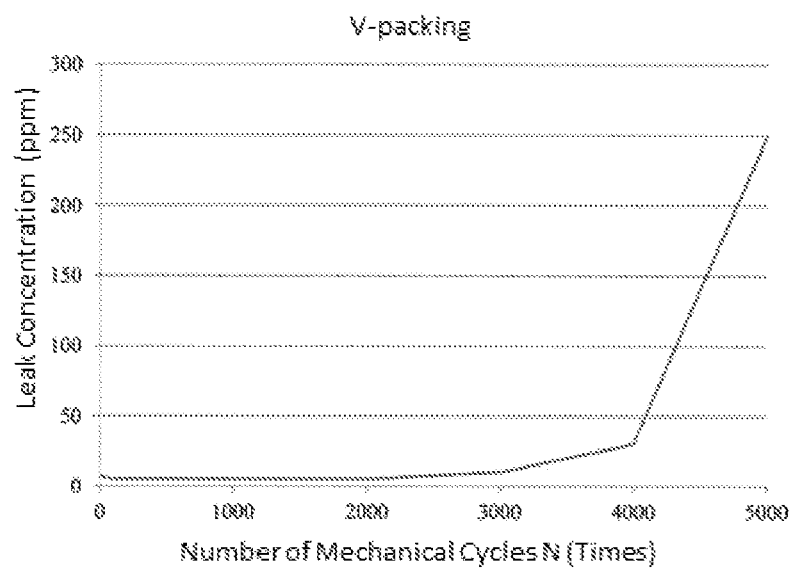
FIG. 9 illustrates an example of the characteristics of a leak concentration of the conventional regulating valve using a V-packing.
Figure 10:
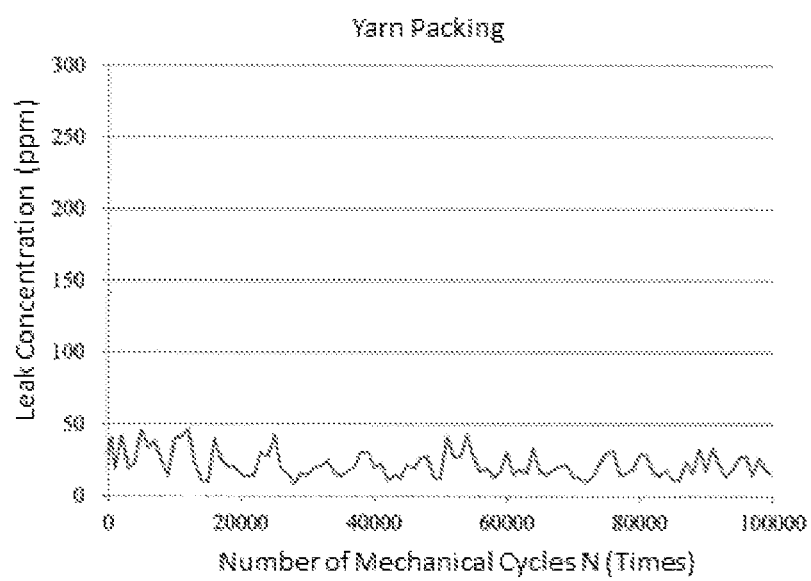
FIG. 10 illustrates an example of the characteristics of a leak concentration of the conventional regulating valve using a yarn packing.

In addition, as in a gland portion 102B illustrated in FIG. 8, a wiper packing 14 may be further provided between the spacer 3 and the valve box 101. This prevents foreign matter from entering the gland portion 102 from the inside of valve box 101. The wiper packing 14 may be any packing that prevents the entry of foreign matter and, for example, may be a packing similar to the packing used as the adapter packing 5.

In addition, although the number of yarn packings 4 is one in the embodiment described above, the number of yarn packings 4 may be changed so as to obtain a sufficient amount of displacement of the disc spring 8 with respect to the amount of expansion of the yarn packings 4 at high temperature. For example, the number of yarn packings 4 may be two.

DESCRIPTION OF REFERENCE NUMERALS AND SIGNS

100: regulating valve, 101: valve box, 102: gland portion, 1: valve stem, 2: stuffing box, 3: spacer, 4: yarn packing, 5: adapter packing, 6: carbon ring, 7: packing follower, 8: disc spring, 9: spring case, 10: packing flange, 11: gland stud, 12: gland nut, 14: wiper packing, 2a: through-hole

The invention claimed is:

1. A regulating valve comprising:
   a valve stem for driving a valve member disposed in a valve box; and
   a gland portion slidably holding the valve stem,
   wherein the gland portion comprises:
      a lid portion having a through-hole communicating with an inside of the valve box, the valve stem being inserted into the through-hole,
      a spacer provided between an inner wall of the through-hole and the valve stem, one yarn packing as a main packing, the yarn packing being disposed above a surface of the spacer, the surface being opposite to the valve box,
      at least two adapter packings disposed above the surface of the spacer with the yarn packing in a slide direction of the valve stem, the adapter packings being made of a material having a smaller thermal expansion coefficient and a higher hardness than the yarn packing,
      a packing follower disposed on one of the adapter packings opposite to the valve box,
      a disc spring disposed on the packing follower, and
      a packing flange disposed above the disc spring and the packing follower, the packing flange being fixed to the lid portion.

2. The regulating valve according to claim 1,
   wherein the yarn packing is a packing having a core material made of expanded graphite and a covering material made of fluororesin, and
   the adapter packings are packings formed by weaving textile of the fluororesin and textile of the expanded carbon together.

3. The regulating valve according to claim 2,
   wherein the gland portion further comprises two carbon rings disposed above the surface of the spacer with the yarn packing and the adapter packings in the slide direction of the valve stem.

4. The regulating valve according to claim 3,
   wherein the gland portion further comprises a wiper packing provided between the spacer and the valve box.

5. The regulating valve according to claim 1,
   wherein the gland portion further comprises two carbon rings disposed above the surface of the spacer with the yarn packing and the adapter packings in the slide direction of the valve stem.

6. The regulating valve according to claim 5,
wherein the gland portion further comprises a wiper packing provided between the spacer and the valve box.
7. The regulating valve according to claim 1,
wherein the gland portion further comprises one or more additional yarn packings.

\* \* \* \* \*